(12) United States Patent
Wu

(10) Patent No.: US 12,259,617 B2
(45) Date of Patent: Mar. 25, 2025

(54) DISPLAY PANEL AND DISPLAY DEVICE

(71) Applicant: TCL CHINA STAR OPTOELECTRONICS TECHNOLOGY CO., LTD., Guangdong (CN)

(72) Inventor: Wanchun Wu, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/758,014

(22) PCT Filed: Apr. 22, 2022

(86) PCT No.: PCT/CN2022/088487
§ 371 (c)(1),
(2) Date: Jun. 26, 2022

(87) PCT Pub. No.: WO2023/197358
PCT Pub. Date: Oct. 19, 2023

(65) Prior Publication Data
US 2024/0192551 A1    Jun. 13, 2024

(30) Foreign Application Priority Data

Apr. 14, 2022   (CN) .......................... 202210391083.6

(51) Int. Cl.
*G02F 1/1343*   (2006.01)
*G09G 3/36*   (2006.01)

(52) U.S. Cl.
CPC ......... *G02F 1/134309* (2013.01); *G09G 3/36* (2013.01); *G09G 2320/0242* (2013.01); *G09G 2320/0247* (2013.01)

(58) Field of Classification Search
CPC ........ G02F 1/134309; G02F 1/134318; G09G 3/36; G09G 2320/0242; G09G 2320/0247
See application file for complete search history.

(56) References Cited

U.S. PATENT DOCUMENTS

| | | | | |
|---|---|---|---|---|
| 2016/0313616 | A1* | 10/2016 | Arai | G02F 1/134309 |
| 2019/0384131 | A1* | 12/2019 | Liu | G02F 1/134309 |
| 2021/0333655 | A1* | 10/2021 | Cao | G02F 1/134309 |

FOREIGN PATENT DOCUMENTS

| | | |
|---|---|---|
| CN | 101021655 A | 8/2007 |
| CN | 101201478 A | 6/2008 |

(Continued)

OTHER PUBLICATIONS

Chinese Office Action issued in corresponding Chinese Patent Application No. 202210391083.6 dated May 27, 2023, pp. 1-7.

(Continued)

*Primary Examiner* — Mariam Qureshi
(74) *Attorney, Agent, or Firm* — PV IP PC; Wei Te Chung

(57) ABSTRACT

Embodiments of the present invention provide a display panel and a display device. The display panel includes a first substrate, a second substrate, and an electrode, the electrode includes a main electrode and a secondary electrode, the main electrode surrounds and is spaced apart from the secondary electrode, the main electrode receives a first voltage signal, and the secondary electrode receives a second voltage signal, so that deflection directions of liquid crystals located in a main electrode region and in a secondary electrode region are different, thereby effectively improving the color cast of a multi-domain liquid crystal display panel and improving the display effect.

20 Claims, 7 Drawing Sheets

(56) References Cited

FOREIGN PATENT DOCUMENTS

| | | |
|---|---|---|
| CN | 104076563 A | 10/2014 |
| CN | 104808401 A | 7/2015 |
| CN | 106249498 A | 12/2016 |
| CN | 106292084 A | 1/2017 |
| CN | 106597763 A | 4/2017 |
| CN | 207020431 U | 2/2018 |
| CN | 108957875 A | 12/2018 |
| CN | 110908195 A | 3/2020 |
| CN | 111221194 A | 6/2020 |
| CN | 112198725 A | 1/2021 |
| CN | 112327544 A | 2/2021 |
| CN | 113176689 A | 7/2021 |
| KR | 20120075331 A | 7/2012 |

OTHER PUBLICATIONS

International Search Report in International application No. PCT/CN2022/088487, mailed on Dec. 27, 2022.
Written Opinion of the International Search Authority in International application No. PCT/CN2022/088487, mailed on Dec. 27, 2022.

\* cited by examiner

DISPLAY PANEL AND DISPLAY DEVICE

TECHNICAL FIELD

The present invention relates to the field of design and manufacture of a display panel, and in particular to a display panel and a display device.

BACKGROUND

With the development of display technologies including manufacturing processes of display panels, higher requirements are put forward for the performance and quality of display panels and devices.

Liquid crystal displays (LCDs) have many advantages such as light and thin, power saving, and low radiation, and are therefore widely used in various display fields, for example, in a liquid crystal television, a mobile phone, a computer screen, or the like. They are dominant in the display field. In the prior art, in order to reduce a problem of color cast of display panels and improve display effect of liquid crystal displays, a multi-domain, such as an eight-domain, display pixel design, is generally applied. Four liquid crystal domains are disposed in a main pixel region of a sub-pixel, and four liquid crystal domains are disposed in a secondary pixel region of the same sub-pixel, thereby achieving a deflection of liquid crystal molecules and improving the color cast. However, in the multi-domain display technology described above, liquid crystal polarities in the main pixel region and the second pixel region of the sub-pixel have an identical deflection, so that it is impossible to deflect the liquid crystal molecules in the main and secondary regions in different directions and polarities in one frame of image, thereby causing a problem that the liquid crystal display panel flickers during displaying, and reducing image quality of the display panel.

Therefore, it is necessary to propose solutions to the problems in the prior art.

SUMMARY

Technical Problems

As described above, the liquid crystal molecules in the multi-domain liquid crystal display panel produced in the prior art cannot be deflected at different angles, which in turn leads to a display problem of easy color cast when displaying, reduces display effect of the display panel, and does not contribute to the improvement of overall performances of the display panel.

Solutions to Problems

Technical Solutions

In order to solve the above problems, embodiments of the present invention provide a display panel and a display device, so as to effectively improve display problems such as easy color cast and flicker of the display panel during displaying, and effectively improve the overall performance of the display panel.

In order to solve the above technical problems, the technical method provided by the embodiments of the present invention is performed as follows:

According to a first aspect of an embodiment of the present invention, there is provided a display panel comprising:

A first substrate comprising a pixel display region, the pixel display region comprising pixel units arranged in an array, and pixel electrodes being disposed in the pixel units; and, A second substrate disposed opposite to the first substrate, a plurality of electrodes being disposed on a side of the second substrate facing the first substrate, each of the electrodes corresponding to the pixel electrode in each of the pixel units;

Wherein the electrode comprises a main electrode and a secondary electrode, the main electrode surrounds and is spaced apart from the secondary electrode; the main electrode receives a first voltage signal, and the secondary electrode receives a second voltage signal, so that a deflection direction of liquid crystals located in a main electrode region is different from a deflection direction of liquid crystals located in a secondary electrode region;

Wherein the pixel display region comprises a main pixel region and a secondary pixel region, the main pixel region is disposed on at least one side of the secondary pixel region, and an area ratio of the main pixel region to the secondary pixel region is 2:3.

According to an embodiment of the present invention, the liquid crystals located in the main electrode region have a first deflection direction under the first voltage signal, and the liquid crystals located in the secondary electrode region have a second deflection direction under the second voltage signal, wherein a deflection angle of the first deflection direction is less than a deflection angle of the second deflection direction.

According to an embodiment of the present invention, the deflection angle of the first deflection direction is 0.8°-1.0°, and the deflection angle of the second deflection direction is 1.2°-1.4°.

According to an embodiment of the present invention, the pixel display region comprises a main pixel region and a secondary pixel region, the main pixel region is disposed on at least one side of the secondary pixel region, wherein both of the main electrode and the secondary electrode correspond to the main pixel region and the secondary pixel region.

According to an embodiment of the present invention, the main electrode comprises a first main electrode and a second main electrode disposed on a side of the first main electrode, and a first blank region and a second blank region are formed within the main pixel region and the secondary pixel region of the first main electrode and the second main electrode, respectively.

According to an embodiment of the present invention, the first blank region and the second blank region are disposed at a center region of the main pixel region and the secondary pixel region, respectively, and an area of the first blank region is less than an area of the second blank region.

According to a second aspect of an embodiment of the present invention, there is provided a display panel comprising:

A first substrate comprising a pixel display region, the pixel display region comprising pixel units arranged in an array, and pixel electrodes being disposed in the pixel units; and, A second substrate disposed opposite to the first substrate, a plurality of electrodes being disposed on a side of the second substrate facing the first substrate, each of the electrodes corresponding to the pixel electrode in each of the pixel units;

Wherein the electrode comprises a main electrode and a secondary electrode, the main electrode surrounds and is spaced apart from the secondary electrode; the main electrode receives a first voltage signal, and the secondary electrode receives a second voltage signal, so that a deflection direction of liquid crystals located in a main electrode region is different from a deflection direction of liquid crystals located in a secondary electrode region.

According to an embodiment of the present invention, the liquid crystals located in the main electrode region have a first deflection direction under the first voltage signal, and the liquid crystals located in the secondary electrode region have a second deflection direction under the second voltage signal, wherein a deflection angle of the first deflection direction is less than a deflection angle of the second deflection direction.

According to an embodiment of the present invention, the deflection angle of the first deflection direction is 0.8°-1.0°, and the deflection angle of the second deflection direction is 1.2°-1.4°.

According to an embodiment of the present invention, the pixel display region comprises a main pixel region and a secondary pixel region, and the main pixel region is disposed on at least one side of the secondary pixel region; wherein the main electrode and the secondary electrode correspond to the main pixel region and the secondary pixel region.

According to an embodiment of the present invention, the main electrode comprises a first main electrode and a second main electrode disposed on a side of the first main electrode, and a first blank region and a second blank region are formed within the main pixel region and the secondary pixel region of the first main electrode and the second main electrode, respectively.

According to an embodiment of the present invention, the first blank region and the second blank region are disposed at a center region of the main pixel region and the secondary pixel region, respectively, and an area of the first blank region is less than an area of the second blank region.

According to an embodiment of the present invention, a connection groove is further disposed in the main electrode, and the first blank region is communicated with the second blank region through the connection groove.

According to an embodiment of the present invention, the connection groove has a width of 10 μm-22 μm.

According to an embodiment of the present invention, the secondary electrode comprises a first secondary electrode and a second secondary electrode, the first secondary electrode and the second secondary electrode are disposed in the first blank region and the second blank region, respectively, and the first secondary electrode is electrically connected to the second secondary electrode by a connection electrode disposed in the connection groove.

According to an embodiment of the present invention, an area of the second secondary electrode is greater than an area of the first secondary electrode.

According to an embodiment of the present invention, an area ratio of the first secondary electrode disposed in the first blank region to the corresponding main electrode in the main pixel region is 1:3.

According to an embodiment of the present invention, an area ratio of the second secondary electrode disposed in the second blank region to the corresponding main electrode in the secondary pixel region is 1:3.

According to an embodiment of the present invention, the display panel further comprises a first common electrode and a second common electrode, the first common electrode and the second common electrode are respectively disposed on two sides of the main electrode and the secondary electrode, and the first common electrode is electrically connected to the main electrode and the second common electrode is electrically connected to the secondary electrode.

According to a third aspect of the present invention, there is further provided a display device comprising a display panel, wherein the display panel is the display panel provided in the embodiments of the present invention.

Beneficial Effects of the Invention

Beneficial Effects

In view of the above, the beneficial effects of the embodiments of the invention are as follows:

Embodiments of the present invention provide a display panel and a display device. The display panel comprises a first substrate, a second substrate, and an electrode, wherein the electrode is disposed on a side of the second substrate close to the first substrate. In an embodiment of the present application, the electrode comprises a main electrode and a secondary electrode, the main electrode surrounds and is spaced apart from the secondary electrode. The main electrode receives a first voltage signal, and the secondary electrode receives a second voltage signal, wherein the first voltage signal is different from the second voltage signal. The first voltage value and the second voltage value of different magnitudes act on liquid crystal molecules in different regions to allow the liquid crystals in the corresponding regions to be deflected in different directions and angles. Therefore, this improves display problems such as color cast and poor display quality of multi-domain liquid crystal display panel when displaying images, and further improves the overall performance of the display panel.

BRIEF DESCRIPTION OF DRAWINGS

Description of Drawings

Figure 1:
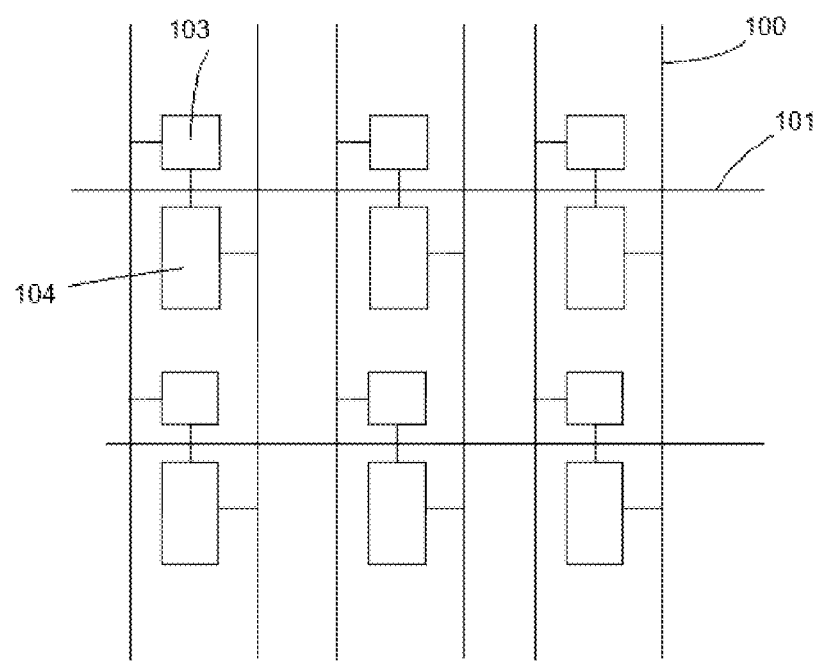

FIG. 1 is an overall architecture diagram of a pixel circuit corresponding to a multi-domain display panel according to the prior art.

Figure 2:
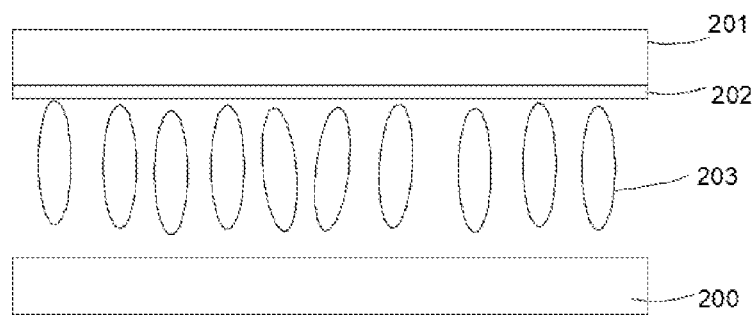

FIG. 2 is a schematic structural view of a film layer of a display panel according to an embodiment of the present invention.

Figure 3:
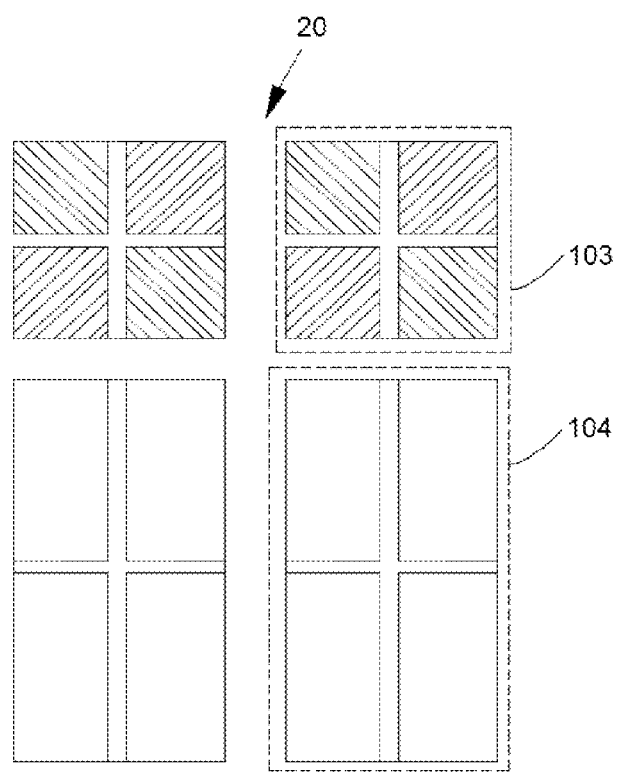

FIG. 3 is a schematic structural view of a pixel display region according to an embodiment of the present application.

Figure 4:
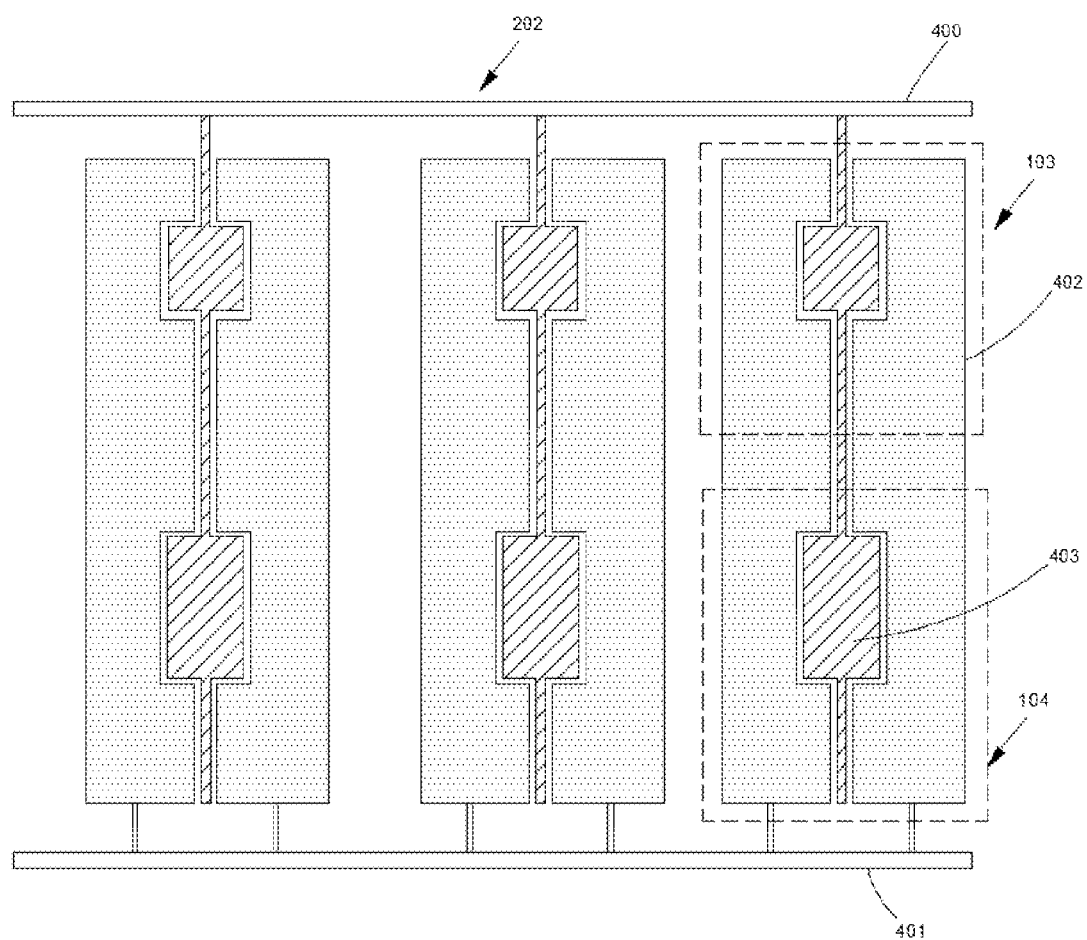

FIG. 4 is a schematic structural view of an electrode according to an embodiment of the present application.

Figure 5:
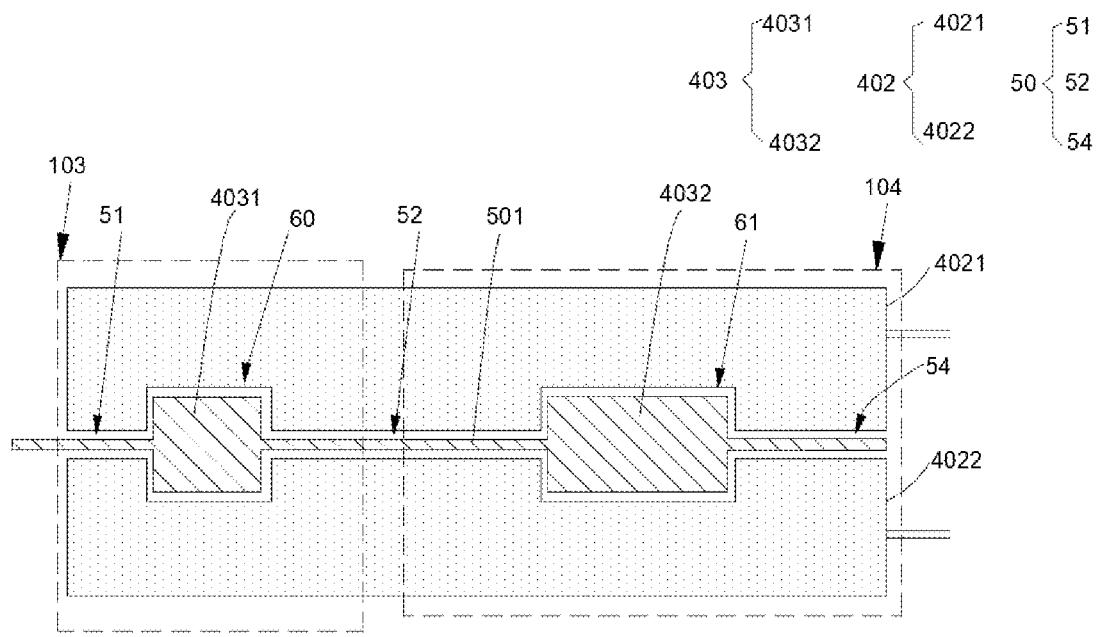

FIG. 5 is a schematic structural view of another electrode according to an embodiment of the present application.

Figure 6:
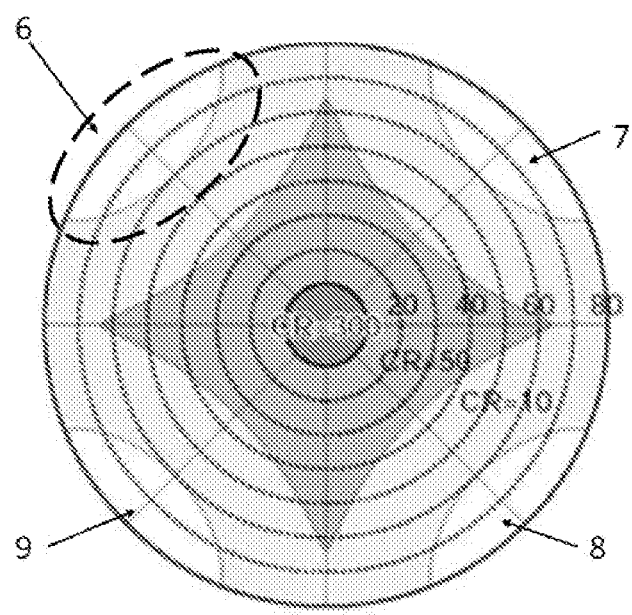

FIG. 6 is a schematic diagram of a viewing angle in a multi-domain pixel region according to an embodiment of the present application.

Figure 7:
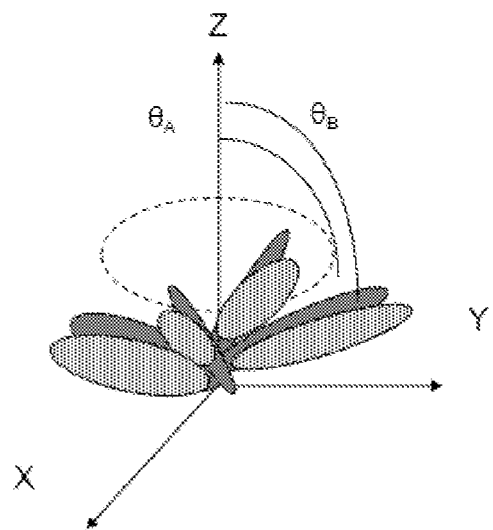

FIG. 7 is a schematic view of a deflection stereoscopic effect of liquid crystal s under an action of electrodes according to an embodiment of the present application.

Figure 8:
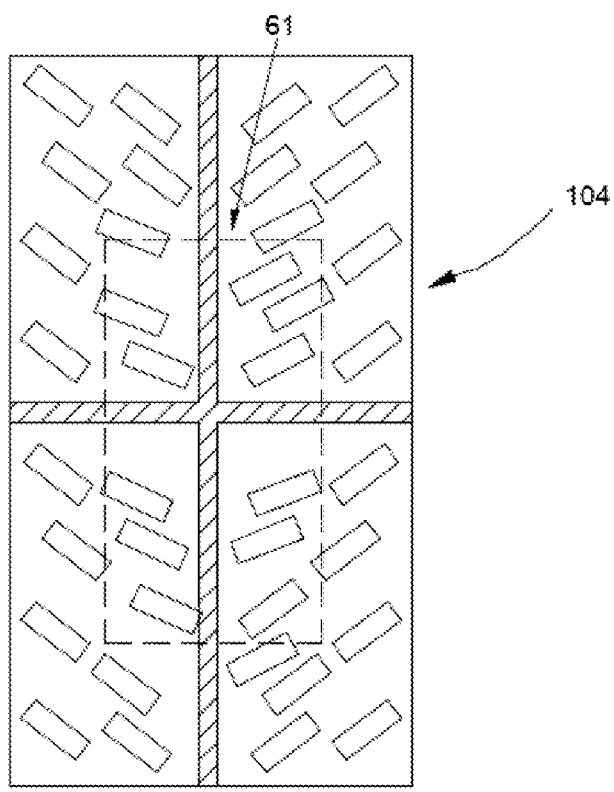

FIG. 8 is a schematic view of an effect of liquid crystals in a secondary pixel region according to an embodiment of the present application.

Figure 9:
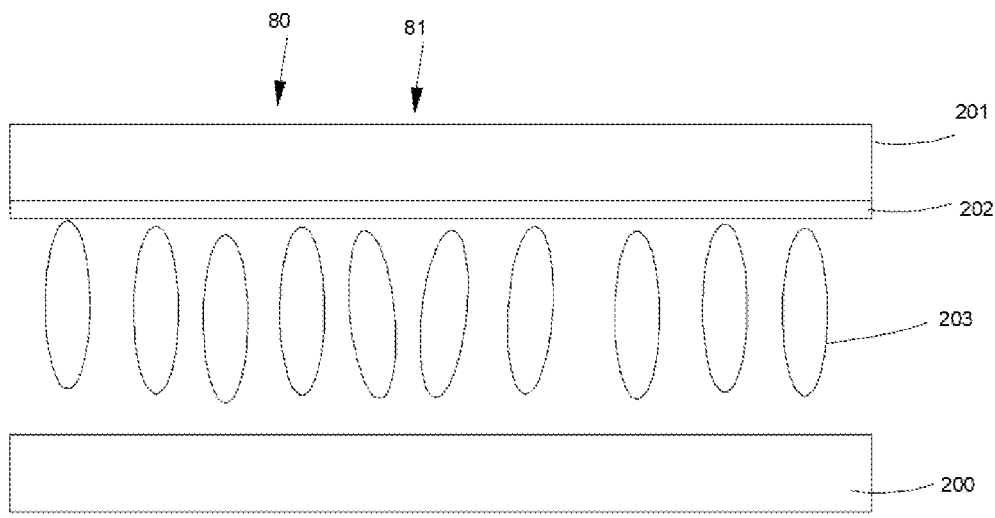

FIG. 9 is a schematic view of liquid crystal deflection according to an embodiment of the present application.

THE PREFERRED EMBODIMENTS TO IMPLEMENT THE INVENTION

Preferred Implementations of the Invention

The following embodiments are described with reference to accompanying drawings to illustrate specific examples for which the present disclosure may be implemented.

With the development of display panel preparation technology, higher requirements are placed on the quality and display effect of the display panel.

As shown in FIG. 1, it is an overall architecture diagram of a pixel circuit corresponding to a multi-domain display panel according to the prior art. In a pixel display region corresponding to a display region of the display panel, a plurality of sub-pixels are arranged in an array, for example, of M*N within the display region of the display panel. Each of the sub-pixels is evenly divided into a main pixel region 103 and a secondary pixel region 104. A scanning signal line 100 is disposed for each row of sub-pixels, and a data signal line 101 is disposed for each column of sub-pixels. The scanning signal line 100 and the data signal line 101 are electrically connected to each of the sub-pixels simultaneously, and supply a scanning signal and a data signal to the main pixel region 103 and the secondary pixel region 104 of the sub-pixel in a corresponding row or column, respectively.

The above-mentioned pixel circuit supplies driving voltages to the corresponding sub-pixels, respectively, when operating. Since a main data signal voltage supplied from the main pixel region 103 has a polarity same as that of a secondary data signal voltage supplied from the secondary pixel region 104, voltages applied to the main pixel region 103 and the secondary pixel region 104 in the same sub-pixel have same polarity, and liquid crystals therein have same deflection angle, in a same frame of image. When viewing from different angles, a certain color cast problem may occur, thereby reducing display effect of the display panel.

Embodiments of the present invention provide a display panel and a display device, which effectively addresses problems that the display panel is prone to color cast and has poor display effect during displaying, thereby improving overall performance of the display panel.

As shown in FIG. 2, it is a schematic structural view of a film layer of a display panel according to an embodiment of the present invention. In the present embodiment, the display panel comprises a first substrate 200, a second substrate 201, a liquid crystal layer 203, and an electrode 202.

Specifically, the first substrate 200 is disposed opposite to the second substrate 201, the liquid crystal layer 203 is disposed in a corresponding region between the first substrate 200 and the second substrate 201, and the electrode 202 is disposed on a side of the second substrate 201 close to the first substrate 200. Preferably, the electrode 202 may be disposed on a side surface of the second substrate 201 facing the first substrate 200.

In an embodiment of the present application, the first substrate 200 is preferably an array substrate, and the second substrate 201 is preferably a color film substrate. The array substrate is provided with a plurality of thin film transistors and a pixel electrode. The pixel electrode may be disposed according to a conventional pixel electrode structure. The display region corresponding to the first substrate 200 and the second substrate 201 is divided into a plurality of pixel display regions 20. The pixel display region 20 comprises a plurality of pixel units arranged in an array, and a pixel electrode is disposed in the pixel unit. The pixel electrode is correspondingly disposed in the pixel display region 20. The plurality of pixel display regions 20 constitute a light emitting display region of the display panel.

The second substrate 201 is disposed opposite to the first substrate 200, and a plurality of electrodes 202 are disposed on a side of the second substrate 201 facing the first substrate 200. Each of the electrodes 202 corresponds to the pixel electrode in each of the pixel units. That is, the electrode 202 corresponds to the pixel display region 20 to supply a driving signal to the thin film transistor in the pixel display region 20.

As shown in FIG. 3, it is a schematic structural view of a pixel display region according to an embodiment of the present application. In conjunction with FIGS. 1 and 2, in an embodiment of the present application, a plurality of sub-pixels are arranged in an array within a pixel display region 20. The pixel display region 20 corresponding to each of the sub-pixels further comprises a main pixel region 103 and a secondary pixel region 104. The main pixel region 103 is disposed on at least one side of the secondary pixel region 104. In an embodiment of the present application, each of the main pixel region 103 and the secondary pixel region 104 is divided into four regions, and the four regions correspond to four liquid crystal domains, thereby forming an eight-domain display panel. Preferably, other number of liquid crystal domains may be provided, and details are not described herein.

In an embodiment of the present application, liquid crystals in a corresponding region of different domains are controlled by an electrode. Specifically, as shown in FIG. 4, it is a schematic structural view of an electrode according to an embodiment of the present application. Specifically, the electrode 202 in an embodiment of the present application corresponds to a pixel display region of the display panel. The electrode 202 comprises a main electrode 402 and a secondary electrode 403. The main electrode 402 is spaced apart from and not in contact with the secondary electrode 403, and the secondary electrode 403 is disposed inside the main electrode 402. That is, in each pixel display region, the main electrode 402 is disposed around the secondary electrode 403, so as to control different electrodes and achieve adjustment of display effect of the display panel.

Preferably, an avoiding gap is disposed in the main electrode 402 to ensure that the main electrode 402 is not in contact with the secondary electrode 403. The main electrode 402 is correspondingly disposed in the main pixel region and the secondary pixel region, and the secondary electrode 403 is also correspondingly disposed in the main pixel region and the secondary pixel region.

Further, the display panel in an embodiment of the present application further comprises a first common electrode 400 and a second common electrode 402. The first common electrode 400 and the second common electrode 401 are disposed on two sides of the main electrode 402 and the secondary electrode 403, respectively.

In an embodiment of the present application, the main electrode 402 is electrically connected to the second common electrode 401 through a corresponding electrode lead, and the secondary electrode 403 is electrically connected to the first common electrode 400 through a corresponding another electrode lead. That is, the second common electrode 401 supplies a first voltage signal to the main electrode 402, and the first common electrode 400 supplies a second voltage signal to the secondary electrode 403. In an embodiment of the present application, the first voltage signal is different from the second voltage signal. When liquid crystals in the display panel are operated, different operating voltages are supplied to the secondary electrode 403 and the main electrode 402 through the first common electrode 400 and the second common electrode 401, respectively.

Since the main electrode 402 has a voltage value different from that of the secondary electrode 403, there is a difference in the electric field formed in the corresponding region. In an embodiment of the present application, liquid crystals located in a region corresponding to the main electrode have a first deflection direction under the first voltage signal, and liquid crystals located in a region corresponding to the secondary electrode have a second deflection direction under the second voltage signal. When liquid crystals are operated, the liquid crystals in different regions, such as different positions of the main pixel region 103 or the secondary pixel region 104, are subjected to different electric field intensities, and further have different deflection angles under the action of different electric field forces, thereby achieving a purpose of reducing the color cast of the display panel and improving the display effect. Preferably, in an embodiment of the present application, an angle of the first deflection direction may be less than that of the second deflection direction, and therefore light rays in different regions are adjusted by liquid crystals with different deflection directions, thereby ensuring the consistency of display effect of the entire pixel display region.

As shown in FIG. 5, it is a schematic structural view of another electrode according to an embodiment of the present application. In an embodiment of the present application, the main electrode 402 is described by taking the first main electrode 4021 and the second main electrode 4022 as an example, and the secondary electrode 403 is described by taking the first secondary electrode 4031 and the second secondary electrode 4032 as an example.

Preferably, the secondary electrode 403 is disposed between the first main electrode 4021 and the second main electrode 4022, and spaced apart from and not in contact with the main electrodes on both sides. The first main electrode 4021 and the second main electrode 4022 are symmetrically disposed with respect to the secondary electrode 403. A first blank region 60 and a second blank region 61 are formed within the main pixel region 103 and the secondary pixel region 104 of the first main electrode 4021 and the second main electrode 4022, respectively. In an embodiment of the present application, the main pixel region 103 may have an area less than that of the secondary pixel region 104. Preferably, an area ratio of the main pixel region 103 to the secondary pixel region 104 is 2:3, so as to adjust a size of a corresponding electrode in different pixel regions. The first blank region 60 formed therein may have an area less than that of the second blank region 61.

Further, the first blank region 60 may have a shape same as that of the second blank region 61, for example, a rectangle, a square, a circle, an ellipse, or other shapes, which are not specifically limited herein. In an embodiment of the present application, rectangle is considered as an example to describe both blank regions.

In an embodiment of the present application, the first blank region 60 and the second blank region 61 may be disposed near the center region of the main pixel region and the secondary pixel region. Therefore, it is ensured that liquid crystals in different pixel regions are controlled to have good consistency, thereby ensuring the display effect of the display panel.

Further, in an embodiment of the present application, the secondary electrode 403 comprises a first secondary electrode 4031 and a second secondary electrode 4032. The first secondary electrode 4031 is disposed within the main pixel region 103, and the second secondary electrode 4032 is disposed within the secondary pixel region 104. The first secondary electrode 4031 is correspondingly disposed in the first blank region 60, and the second secondary electrode 4032 is correspondingly disposed in the second blank region 61. There is no contact between the first secondary electrode 4031 and the second secondary electrode 4032.

In an embodiment of the present application, both of the first secondary electrode 4031 and the second secondary electrode 4032 are disposed as a rectangular structure, and the first secondary electrode 4031 has an area less than that of the second secondary electrode 4032. Preferably, an area ratio of the first secondary electrode 4031 to the second secondary electrode 4032 may be set to 2:3.

Preferably, a connection groove 50 is disposed in the electrode. The connection groove 50 is connected to the first blank region 60 and the second blank region 61. The connection groove 50 may comprise a plurality of segments that are correspondingly communicated with different blank regions. For example, a connection groove 51 is connected to a side of the first blank region 60, a connection groove 52 is connected to both of the first blank region 60 and the second blank region 61, and a connection groove 54 is connected to a side of the second blank region 61, thereby forming a arrangement structure of the secondary pixel electrode.

In an embodiment of the present application, the width of the connection groove 51, the connection groove 52, and the connection groove 54 may be set to be the same. Preferably, the width is set to 10 μm-22 μm to ensure better consistency between the different electrodes, thereby precisely adjusting liquid crystals in different regions.

A connection electrode 501 is disposed between the first secondary electrode 4031 and the second secondary electrode 4032. The connection electrode 501 is disposed in a corresponding connection groove to electrically connect different second secondary electrodes 4032 with each other. In an embodiment of the present application, the distance between the connecting electrode 501 and the first and second main electrode 4021 and 4022 on both sides is set to 4 μm-10 μm. This prevents a problem of short circuit and mutual interference between different trunk electrodes, and ensures that the display panel has good reliability.

Further, in an embodiment of the present application, in order to ensure that the electrode has a good adjusting effect, an area ratio of the first secondary electrode 4031 in the first blank region 60 to the first main electrode 4021 or the second main electrode 4022 in the main pixel region 103 is 1:3, and an area ratio of the second secondary electrode 4032 in the second blank region 61 to the first main electrode 4021 or the second main electrode 4022 in the secondary pixel region 104 is 1:3, when disposing different electrodes in the main pixel region 103 and the secondary pixel region 104. Alternatively, the area ratio between the above different electrodes may be set to another numerical value, and specifically, may be set according to display effect of a actual product, which is not specifically limited herein.

Preferably, the blank regions and the corresponding secondary electrodes may further be set to other shapes, and the number of the blank regions in the embodiments of the present application may be set according to a actual product.

Specifically, as shown in FIG. 6, it is a schematic diagram of a viewing angle in a multi-domain pixel region according to an embodiment of the present application. In the multi-domain pixel region, viewing angles at the upper, lower, left and right positions corresponding to the region are better, and viewing angles in the region 6, region 7, region 8, and region 9 are poor, according to the equivalent schematic diagram. In an embodiment of the present application, different electrodes are disposed in a region with a poor viewing angle. The electrodes may receive different voltage signals, and liquid crystals in the regions can be adjusted by the different voltage signals, thereby improving the display effect and improving a viewing angle visualization.

As shown in FIG. 7, it is a schematic view of a deflection stereoscopic effect of liquid crystals under an action of electrodes in an embodiment of the present application. In the case of applying a electrode structure in the embodiments of the present application, a main electrode may receive a first voltage signal, a secondary electrode may receive a second voltage signal, and the first voltage signal is different from the second voltage signal. When liquid crystals are deflected, first angle-deflected liquid crystals and second angle-deflected liquid crystals are correspondingly formed. The deflection angle of the first angle-deflected liquid crystals is θA, corresponding to the region where the main electrode is located. The deflection angle of the second angle-deflected liquid crystals is θB, corresponding to the region where the secondary electrode is located. Liquid crystals with two different angles have different effects on light rays, and in turn the viewing angles within total field of view can be compensated, thereby effectively improving a problem of poor viewing angle field of the display panel in some regions and improving the color cast of the display panel.

Further, as shown in FIG. 8, it is a schematic view of an effect of liquid crystals in a secondary pixel region according to an embodiment of the present application. This region is illustrated by taking the secondary pixel region 104 as an example. A second blank region 61 is disposed in the center region of the secondary pixel region 104, and a second secondary electrode is disposed on a film layer at a position corresponding to the second blank region 61. A main electrode is disposed in other regions. When different voltage signals are supplied to the main and secondary electrodes, different electric fields are formed in different regions.

Preferably, a second voltage signal is disposed on the secondary electrode, a first voltage signal is disposed on the main electrode, and a voltage value of the first voltage signal is less than that of the second voltage signal. In this case, an electric field intensity in a region corresponding to the secondary electrode is greater than an electric field intensity in a region corresponding to the main electrode. The liquid crystals may be deflected at different angles by the action of the main and secondary electrodes, respectively, which eventually allows the liquid crystals in the second blank region 61 to be deflected at an angle greater than the liquid crystals in the other regions, thereby effectively improving the display effect in the pixel region.

Accordingly, as shown in FIG. 9, it is a schematic view of liquid crystal deflection according to an embodiment of the present application. In conjunction with FIGS. 6 to 8, in the embodiments of the present application, in a display region, the liquid crystal region on which a main electrode acts is the first region 80, and the liquid crystal region in which a secondary electrode acts is the second region 81. In this case, the deflection angle of liquid crystals in the second region 81 is larger than the deflection angle of liquid crystals in the first region 80. In an embodiment of the present application, the deflection angle of liquid crystals in a first deflection direction in the first region 80 is 0.8°-1.0°, preferably 0.9°. The deflection angle of liquid crystals in a second deflection direction in the second region 81 is 1.2°-1.4°, preferably 1.3°. Thus, liquid crystals in different regions are controlled so that liquid crystals in different pixel domains are tilted to different degrees, thereby improving the color cast problem of the viewing angle.

In the embodiments of the present application, the main and secondary electrodes can be prepared by yellow light process technology, resulting in the electrode structure required in the embodiments of the present application.

Embodiments of the present application further provide a display device comprising a display panel. An electrode structure according to the embodiments of the present application are disposed inside the display panel. The electrode comprises a main electrode and a secondary electrode. The main electrode is connected to a first voltage signal, and the secondary electrode is connected to a second voltage signal. The first voltage signal is different from the second voltage signal. Further, liquid crystal s in different pixel domain regions are controlled by the different voltage signals, thereby reducing the color cast of the display panel, and improving the display effect of the display panel.

Further, the display device may be any product or component having a display function, such as an OLED panel, a mobile phone, a computer, electronic paper, a display, a notebook computer, or a digital photo frame, and the specific type thereof is not specifically limited.

A display panel and a display device according to the embodiments of the present invention are described in detail above. specific examples are applied herein to illustrate the principles and implementation of the present invention. The description of the above embodiments is only used to help understand the technical solutions and core ideas of the present invention. Those of ordinary skill in the art will appreciate that it is still possible to modify the technical solutions described in the foregoing embodiments, or to equivalently substitute some of the technical features thereof. These modifications or substitutions do not leave the essence of the corresponding technical solutions out of the scope of the technical solutions of the embodiments of the present invention.

What is claimed is:
1. A display panel comprising:
a first substrate comprising a pixel display region, the pixel display region comprising pixel units arranged in an array, and pixel electrodes being disposed in the pixel units; and,
a second substrate disposed opposite to the first substrate, a common electrode being disposed on a side of the second substrate facing the first substrate, wherein the common electrode comprises a first common electrode, a second common electrode, a plurality of main electrodes, and a plurality of secondary electrodes, the plurality of main electrodes and the plurality of secondary electrodes are disposed between the first common electrode and the second common electrode, and the plurality of main electrodes and the plurality of secondary electrodes face the pixel electrodes in the pixel units,
wherein each of the plurality of main electrodes surrounds and is spaced apart from each of the plurality of secondary electrodes; each of the plurality of main electrodes is electrically connected to the first common electrode to receives a first voltage signal, each of the plurality of secondary electrode is electrically connected to the second common electrode to receives a second voltage signal, and the first voltage signal is different from the second voltage signal, so that a deflection direction of liquid crystals located in a main electrode region is different from a deflection direction of liquid crystals located in a secondary electrode region.

2. The display panel according to claim 1, wherein the liquid crystals located in the main electrode region have a first deflection direction under the first voltage signal, and the liquid crystals located in the secondary electrode region have a second deflection direction under the second voltage signal,
wherein a deflection angle of the first deflection direction is less than a deflection angle of the second deflection direction.

3. The display panel according to claim 2, wherein the deflection angle of the first deflection direction is 0.8°-1.0°, and the deflection angle of the second deflection direction is 1.2°-1.4°.

4. The display panel according to claim 1, wherein the pixel display region comprises a main pixel region and a secondary pixel region, the main pixel region is disposed on at least one side of the secondary pixel region, and an area ratio of the main pixel region to the secondary pixel region is 2:3, and
the plurality of main electrodes corresponds to the main pixel region, and the plurality of secondary electrodes corresponds to the secondary pixel region.

5. The display panel according to claim 4, wherein each of the plurality of main electrodes comprises a first main electrode and a second main electrode disposed on a side of the first main electrode, and a first blank region and a second blank region are formed between the first main electrode and the second main electrode and corresponding to the main pixel region and the secondary pixel region respectively.

6. The display panel according to claim 5, wherein the first blank region and the second blank region are disposed corresponding to a center region of the main pixel region and the secondary pixel region, respectively, and an area of the first blank region is less than an area of the second blank region.

7. A display panel comprising:
a first substrate comprising a pixel display region, the pixel display region comprising pixel units arranged in an array, and pixel electrodes being disposed in the pixel units; and,
a second substrate disposed opposite to the first substrate, a common electrode being disposed on a side of the second substrate facing the first substrate, wherein the common electrode comprises a plurality of main electrodes and a plurality of secondary electrodes, and the plurality of main electrodes and the plurality of secondary electrodes face the pixel electrodes in the pixel units,
wherein each of the plurality of main electrodes surrounds and is spaced apart from each of the plurality of secondary electrodes; each of the plurality of main electrodes receives a first voltage signal, each of the plurality of secondary electrodes receives a second voltage signal, and the first voltage signal is different from the second voltage signal, so that a deflection direction of liquid crystals located in a main electrode region is different from a deflection direction of liquid crystals located in a secondary electrode region.

8. The display panel according to claim 7, wherein the liquid crystals located in the main electrode region have a first deflection direction under the first voltage signal, and the liquid crystals located in the secondary electrode region have a second deflection direction under the second voltage signal,
wherein a deflection angle of the first deflection direction is less than a deflection angle of the second deflection direction.

9. The display panel according to claim 8, wherein the deflection angle of the first deflection direction is 0.8°-1.0°, and the deflection angle of the second deflection direction is 1.2°-1.4°.

10. The display panel according to claim 7, wherein the pixel display region comprises a main pixel region and a secondary pixel region, and the main pixel region is disposed on at least one side of the secondary pixel region; wherein each of the plurality of main electrodes corresponds to the main pixel region, and each of the plurality of secondary electrodes corresponds to the secondary pixel region.

11. The display panel according to claim 10, wherein each of the plurality of main electrodes comprises a first main electrode and a second main electrode disposed on a side of the first main electrode, and a first blank region and a second blank region are formed between the first main electrode and the second main electrode and corresponding to the main pixel region and the secondary pixel region, respectively.

12. The display panel according to claim 11, wherein the first blank region and the second blank region are disposed corresponding to a center region of the main pixel region and the secondary pixel region, respectively, and an area of the first blank region is less than an area of the second blank region.

13. The display panel according to claim 11, wherein a connection groove is further disposed in each of the plurality of main electrodes, and the first blank region is communicated with the second blank region through the connection groove.

14. The display panel according to claim 13, wherein the connection groove has a width of 10 μm-22 μm.

15. The display panel according to claim 13, wherein each of the plurality of secondary electrodes comprises a first secondary electrode and a second secondary electrode, the first secondary electrode and the second secondary electrode are disposed in the first blank region and the second blank region, respectively, and the first secondary electrode is electrically connected to the second secondary electrode by a connection electrode disposed in the connection groove.

16. The display panel according to claim 15, wherein an area of the second secondary electrode is greater than an area of the first secondary electrode.

17. The display panel according to claim 15, wherein an area ratio of the first secondary electrode disposed in the first blank region to a corresponding one of the plurality of main electrodes corresponding to the main pixel region is 1:3.

18. The display panel according to claim 15, wherein an area ratio of the second secondary electrode disposed in the second blank region to a corresponding one of the plurality of main electrodes corresponding to the secondary pixel region is 1:3.

19. The display panel according to claim 7, wherein the common electrode further comprises a first common electrode and a second common electrode, the first common electrode and the second common electrode are respectively disposed on two sides of the plurality of main electrodes and the plurality of secondary electrodes, and the first common electrode is electrically connected to the plurality of main electrodes and the second common electrode is electrically connected to the plurality of secondary electrodes.

20. A display device comprising a display panel, the display panel comprising:

a first substrate comprising a pixel display region, the pixel display region comprising pixel units arranged in an array, and pixel electrodes being disposed in the pixel units; and, a second substrate disposed opposite to the first substrate, a common electrode being disposed on a side of the second substrate facing the first substrate, wherein the common electrode comprises a plurality of main electrodes and a plurality of secondary electrodes, and the plurality of main electrodes and the plurality of secondary electrodes face the pixel electrodes in the pixel units;

wherein each of the plurality of main electrodes surrounds and is spaced apart from each of the plurality of secondary electrodes; each of the plurality of main electrodes receives a first voltage signal, each of the plurality of secondary electrodes receives a second voltage signal, and the first voltage signal is different from the second voltage signal, so that a deflection direction of liquid crystals located in a main electrode region is different from a deflection direction of liquid crystals located in a secondary electrode region.

* * * * *